INVENTORS.
EDWIN B. HENRY JR.,
DONALD G. SCHINDLER &
WILLIAM L. ZEMBERRY
By Donald G. Dalton
Attorney

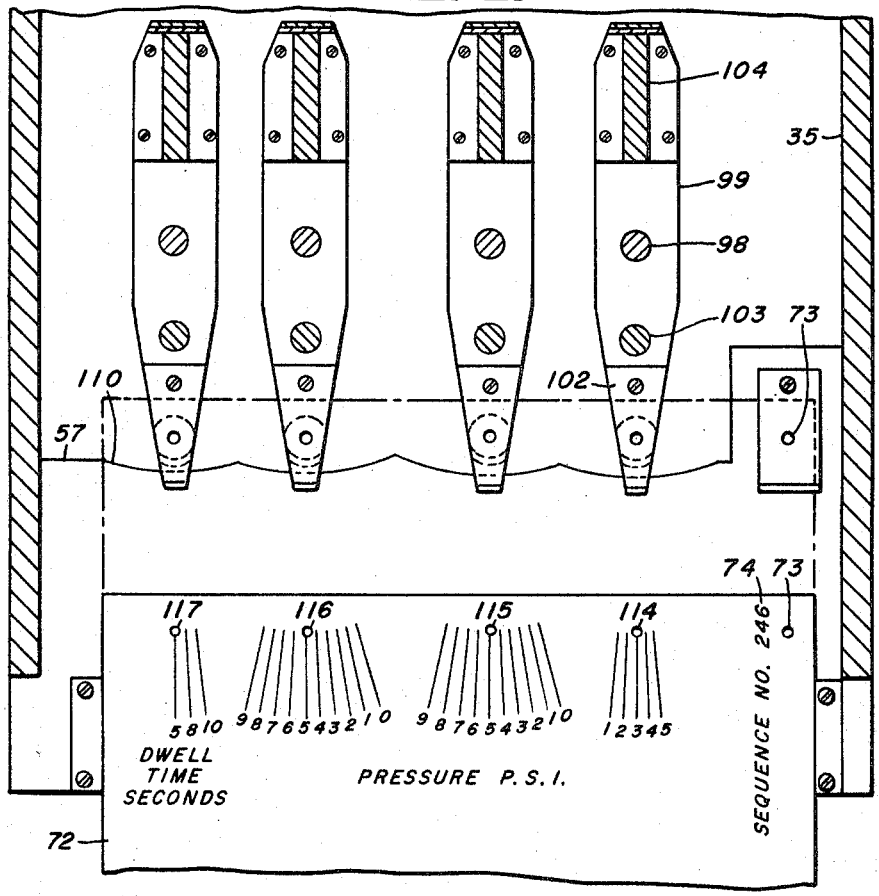
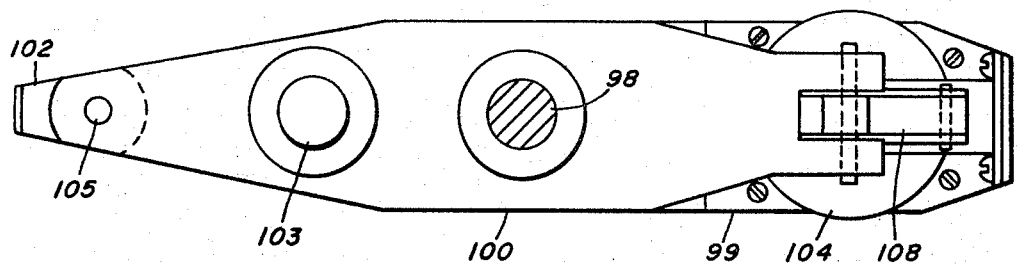
INVENTORS.
EDWIN B. HENRY JR.,
DONALD G. SCHINDLER and
WILLIAM L. ZEMBERRY
By Donald G. Dalton
Attorney

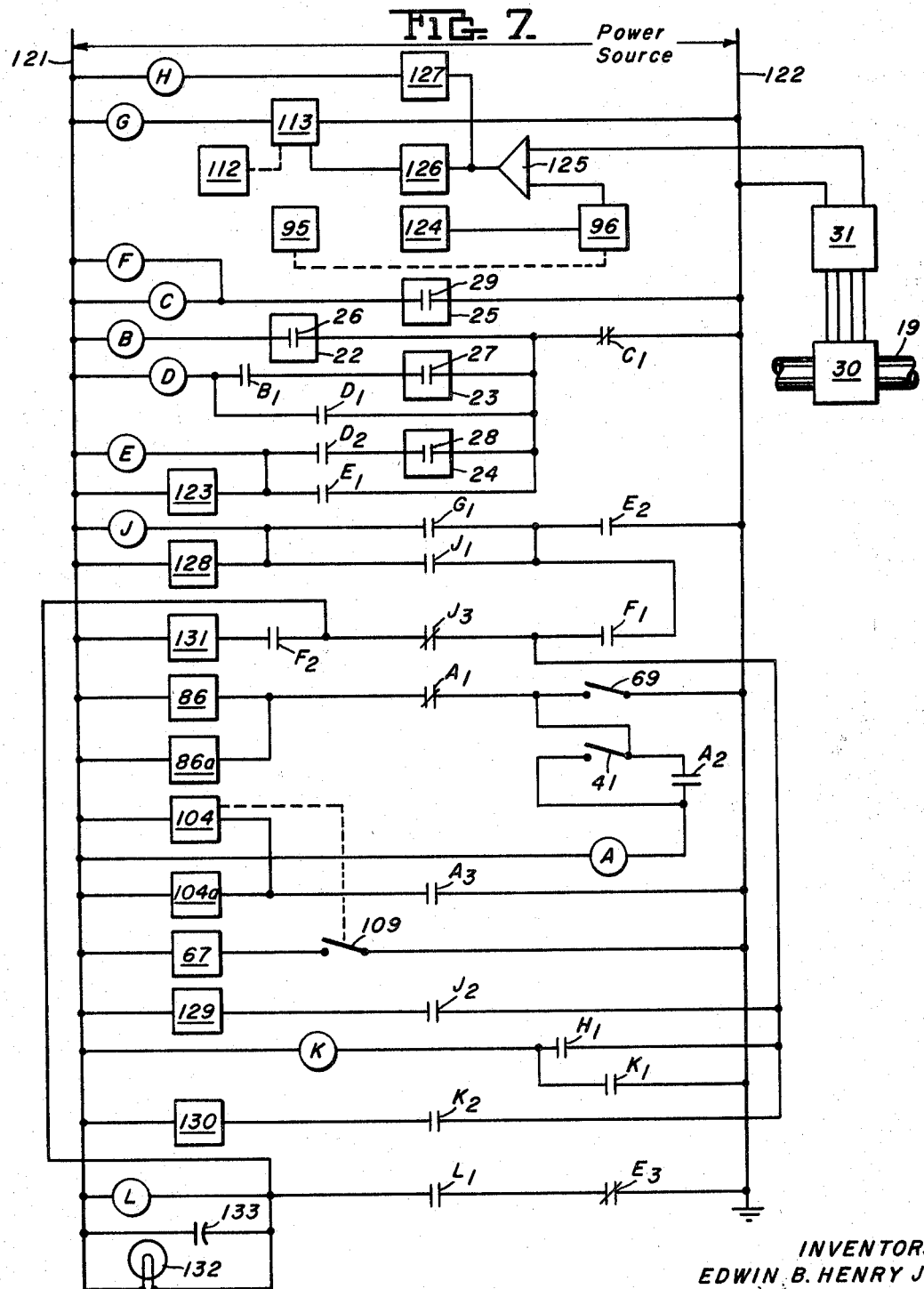

United States Patent Office 3,430,485
Patented Mar. 4, 1969

3,430,485
APPARATUS FOR MONITORING THE OPERATION OF A PRESSURE-TESTING MACHINE AND RECORDING THE RESULTS
Edwin B. Henry, Jr., Mt. Lebanon Township, Allegheny County, Donald G. Schindler, Whitehall Borough, and William L. Zemberry, Swissvale Borough, Pa., assignors to United States Steel Corporation, a corporation of Delaware
Filed Apr. 7, 1967, Ser. No. 629,221
U.S. Cl. 73—49.6     15 Claims
Int. Cl. G01m 3/04

ABSTRACT OF THE DISCLOSURE

An apparatus for monitoring the operation of a pressure-testing machine to assure that items tested are held at the specified pressure for the specified time. The apparatus marks a tally sheet to record the pressure and time to be used in the tests, and numbers the sheet for identification. It counts the number of items tested and the number which are acceptable, and marks each item as to whether it is acceptable or rejected. The apparatus is designed to be tamper-proof.

---

Figure 1:
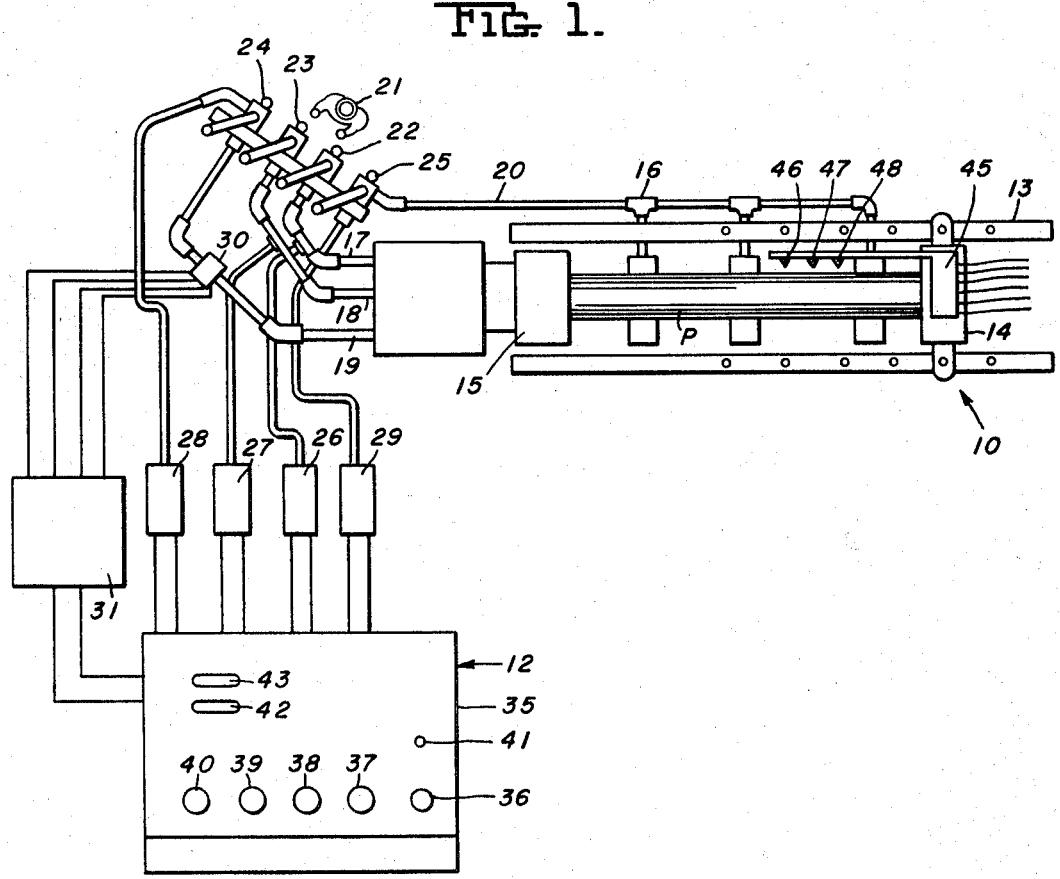

This invention relates to an improved apparatus for monitoring the operation of a pressure-testing machine and recording the results.

Although our invention is not thus limited, the apparatus is particularly useful as applied to a hydrostatic testing machine for metal pipes. A conventional hydrostatic testing machine comprises essentially a bench for supporting a pipe, a pair of relatively movable heads for sealing the ends of the pipe, a connection to one of the heads for filling the pipe with water, means for applying pressure to the water, and a kickout mechanism for removing the pipe at the conclusion of a test. The testing procedure calls for holding each pipe at a specified pressure (commonly in the range of 400 to 5000 p.s.i.) for a specified "dwell" time (commonly 2 to 10 seconds). If a pipe does not withstand the test, it is of course rejected. Another possibility is that a pipe may be subjected to excessive pressure and damage during the test. Reference can be made to McNabb Patent No. 2,896,445 or McConnell Patent No. 2,907,202 for exemplary showings of such machines.

It is known to equip a hydrostatic pipe-testing machine with control and recording mechanisms which the operator can set to the specified pressure and "dwell" time. One form of control mechanism includes three signal lamps, the first of which lights when the pipe is in place and filled with water, whereupon the operator opens valves to apply pressure. The second lights when the pressure reaches the specified value for the test. The third lights as soon as the pipe has been held at this pressure for the specified time, so that the operator knows when to terminate the test and remove the pipe. The recording mechanism has a counter which records the number of times the test conditions have been met. However, such mechanisms are not tamper-proof, and the operator's pay may be based on the number of tests he runs and the number of pipes which meet the test conditions. The counter might register repeated tests on the same pipe, while other pipes go untested. Also it is difficult to correlate test results with a specific pipe. There is no way of indicating that a pipe has been subject to excessive pressure and possibly damaged.

An object of our invention is to provide an improved monitoring and recording apparatus which can be applied to a pressure-testing machine to overcome the foregoing difficulties, that is, an apparatus which is tamper-proof and which positively identifies each item tested in the machine.

A further object is to provide an improved monitoring and recording apparatus which automatically marks each item tested as to its classification, to wit, accepted, rejected or subjected to excessive pressure in testing.

A further object is to provide a monitoring and recording apparatus which registers counts both of the number of items tested and the number which meet the test conditions, but registers only complete tests and not repeated tests on the same item.

A further object is to provide a monitoring and recording apparatus of the foregoing type which is of relatively simple construction and readily installed on existing testing machines.

Figure 2:
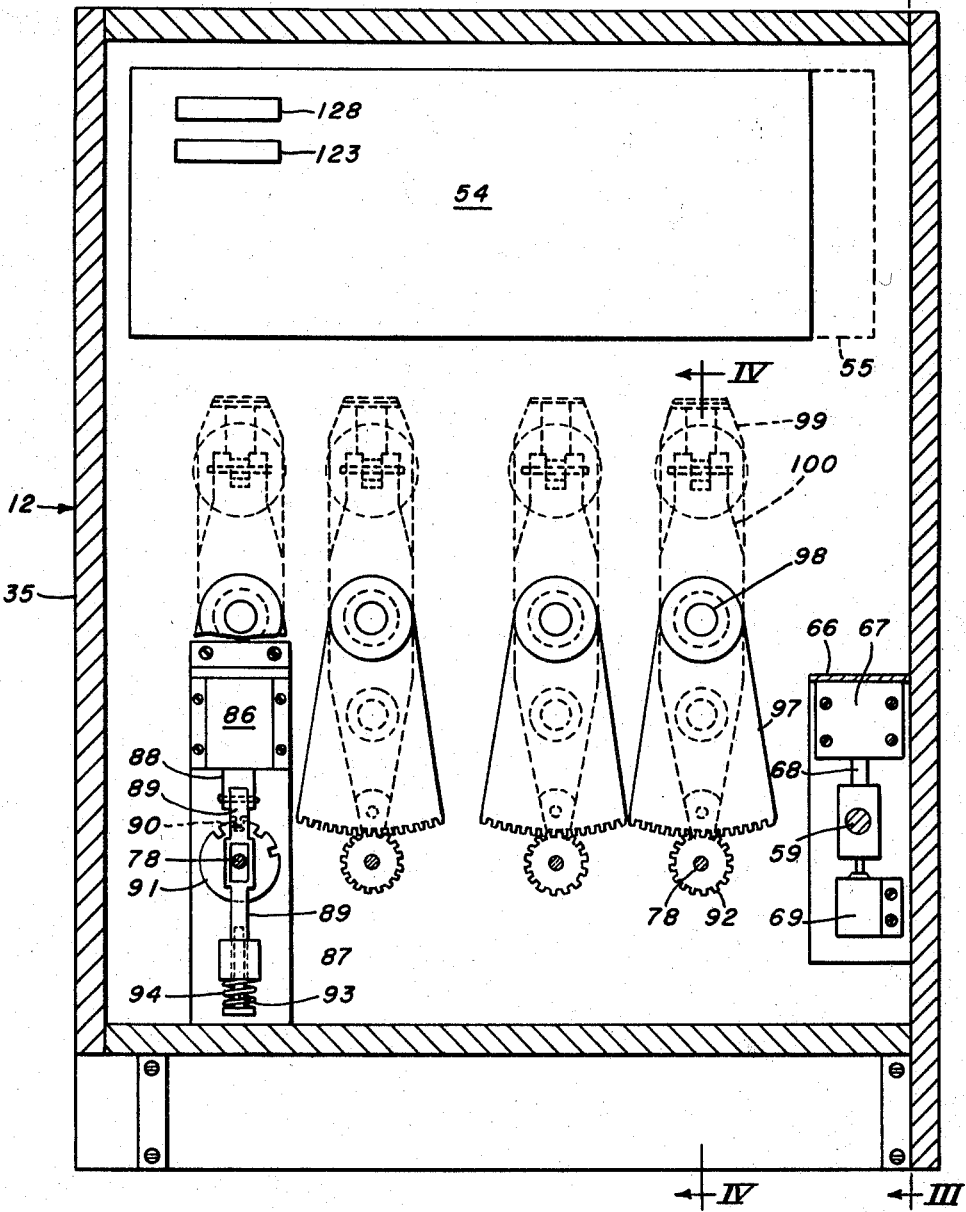
Figure 3:
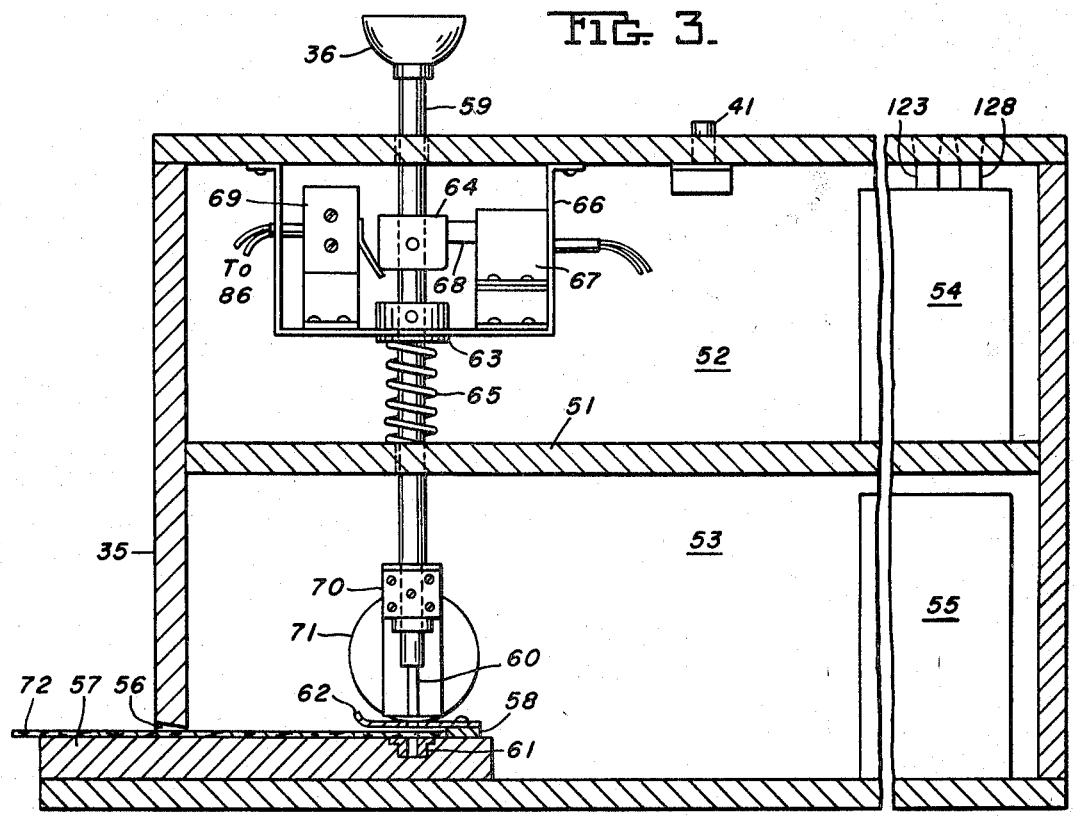
Figure 4:
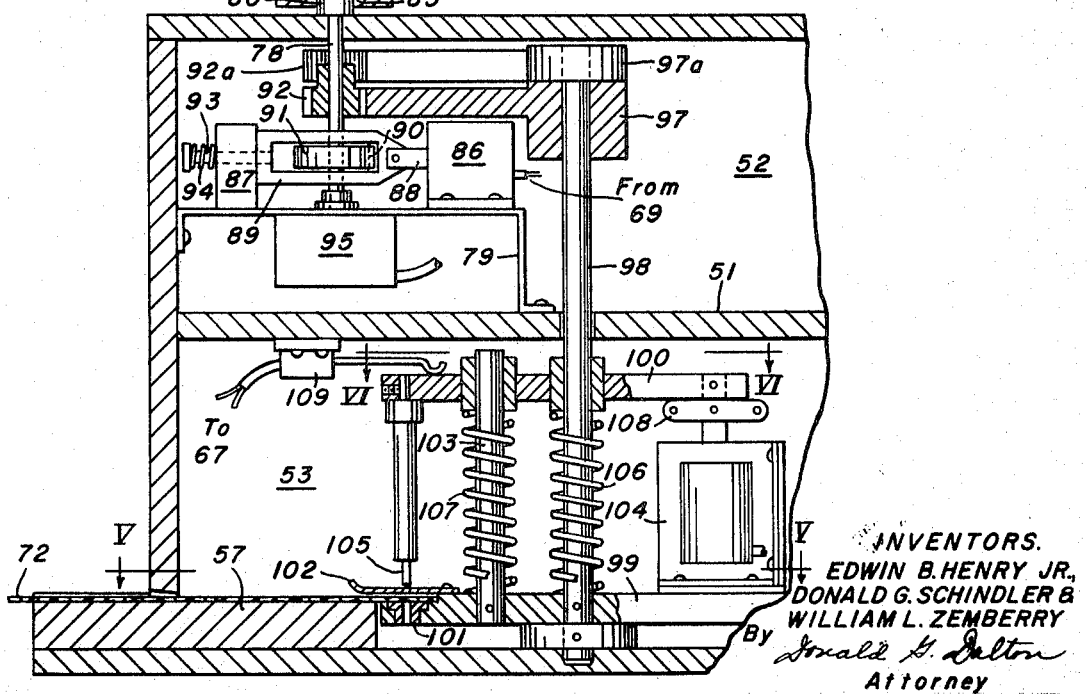

In the drawings:
FIGURE 1 is a diagrammatic layout of a hydrostatic pipe-testing machine equipped with our monitoring and recording apparatus;
FIGURE 2 is a top plan view of our apparatus with the cover removed and parts broken away;
FIGURE 3 is a vertical section on line III—III of FIGURE 2;
FIGURE 4 is a vertical section on line IV—IV of FIGURE 2;
FIGURE 5 is a horizontal section on line V—V of FIGURE 4;
FIGURE 6 is a partial horizontal section on a larger scale on line VI—VI of FIGURE 4 omitting the switch arm; and
FIGURE 7 is a schematic wiring diagram of the electric circuit embodied in our apparatus.

Layout

FIGURE 1 shows diagrammatically a conventional hydrostatic pressure-testing machine 10 and a monitoring and recording apparatus 12 constructed in accordance with our invention. A pipe P is installed in the machine for testing. The machine includes a cradle 13, opposite relatively movable heads 14 and 15 for sealing the ends of the pipe, and a kickout mechanism 16. The position of the field-end head 14 can be adjusted to accommodate pipes of different length, but normally this head remains stationary during any series of tests. The mill-end head 15 is motivated hydraulically into sealing engagement with the pipe end and advanced as the pipe contracts lengthwise during the test. The line for admitting hydraulic fluid to operate the head 15 is indicated at 17. Water is introduced to the pipe through an inlet line 18. Pressure is applied to the water through an intensifying line 19. The kickout mechanism 16 also is motivated hydraulically, and the line for admitting hydraulic fluid thereto is indicated at 20. The operator's station is indicated at 21, where there are accessible to him a valve 22 for operating the head 15, a valve 23 for admitting water through line 18, a valve 24 for intensifying the pressure through line 19, and a valve 25 for operating the kickout mechanism 16.

We connect four normally open pressure switches 26, 27, 28 and 29 to the lines 17, 18, 19 and 20 respectively and to our apparatus. Each switch closes as the valve in the corresponding line is opened to apply pressure to the switch. We connect a pressure sensor 30 to the intensifying line 19, and a recorder 31 to the pressure sensor. The recorder transmits to our apparatus 12 a voltage signal representative of the actual pressure on the pipe applied through the intensifying line 19. The pressure sensor and recorder per se are known devices which are available commercially; hence we have not included a description. One example of a suitable pressure sensor is a Baldwin-Lima-Hamilton SR–4 Pressure Cell. One example of a suitable recorder is a Leeds and Northrup "Speedomax," Type G. We explain the purpose of the switches and sensor hereinafter in the description of our electric circuit.

Our monitoring and recording apparatus 12 includes a housing 35, projecting from the cover of which are a vertically movable punch handle 36, four rotatable knobs 37, 38, 39 and 40 for setting the conditions to be followed in a test or series of tests, and a "print" switch button 41. Knobs 37, 38 and 39 set the "thousands," "hundreds" and "tens" digits respectively of the pressure to be used in the test, and knob 40 the "dwell" time at which the pipe is to be held at this pressure. The cover also has windows 42 and 43 through which are displayed a "total piece" count and an "incentive" count (acceptable pieces) respectively.

Our apparatus also includes a paint spray device 45 mounted on the field-end head 14 of the testing machine 10. Preferably this device has three spray nozzles 46, 47 and 48 for applying to each pipe P a marking to indicate whether the pipe is acceptable, rejected or subjected to excess pressure in testing. Conveniently each nozzle is connected to a source of paint of a different color to distinguish the pipes. We explain how this device operates hereinafter in the description of our electric circuit.

*Mechanical construction*

FIGURES 2 to 6 show in detail the mechanism within the housing 35. A horizontal partition 51 divides the interior of the housing into upper and lower compartments 52 and 53. Boxes 54 and 55 within these compartments contain the electric circuit components hereinafter described. The front wall of the housing has a slot 56 along its lower edge (FIGURE 3). The bottom wall projects outwardly of this slot and carries a guide plate 57, which extends through the slot and has a stop 58 at its inner edge. The punch handle 36 is joined to a vertically movable shaft 59, the lower end of which carries a punch 60. Plate 57 carries a cooperating die 61 and stripper 62. Shaft 59 also carries a collar 63 and a cam 64. A spring 65 encircles shaft 59 and urges the shaft upwardly. A bracket 66 depends from the cover of the housing and carries a solenoid 67 which has an armature 68. The armature is spring-biased, whereby it normally engages the cam, but when the solenoid is energized, the armature is retracted from the cam. Bracket 66 also carries a normally open switch 69 to be actuated by the cam. A yoke 70 connects the lower end of shaft 59 to a sequence numbering stamp 71, which per se is a commercially available device. One suitable form is the Model X1-64 of Bates Manufacturing Company, Orange, N.J.

Before testing a pipe P or a series of such pipes to be tested under the same conditions, we insert a paper tally sheet 72 into our apparatus. The sheet enters slot 56 and passes between the die 61 and stripper 62 into abutment with stop 58. We depress handle 36 and thereby punch a hole 73 in the tally sheet (FIGURE 5). Armature 68 engages the upper face of cam 64 and locks shaft 59 in its depressed position. Hence the punch 60 also locks the tally sheet in the housing, whereby the sheet cannot be removed at this stage without tearing it. Cam 64 closes switch 69 to complete a circuit hereinafter described. The sequence-numbering stamp 71 stamps numbers on successive tally sheets, as indicated at 74. Thus the tally sheet can show a stamped number only if properly locked in the housing.

The mechanisms to which each of the four knobs 37, 38, 39 and 40 are connected are alike except for differences hereinafter pointed out; hence we describe in detail only the mechanism with which we set the "thousands" digit of the pressure (knob 37). Knob 37 is mounted on a rotatable shaft 78, the lower end of which is journaled in a bracket 79 carried by partition 51 (FIGURE 4). Normally shaft 78 is locked against rotation to prevent tampering, as hereinafter explained. Preferably we mount the knob to allow it to turn idly when the shaft is locked. Our preferred mounting means includes a collar 80 fixed to the upper end of shaft 78 and having a circumferential groove 81 and socket 82 in its outer surface. Knob 37 receives the collar and has a set screw 83, the tip of which rides in groove 81 to hold the knob on the shaft. The knob also contains a spring 84 and a ball 85 urged inwardly by the spring held in place by another set screw. Normally the socket 82 receives the ball, whereby rotation of knob 37 rotates shaft 78, provided the shaft is unlocked. If the knob is turned when the shaft is locked, the ball rides out of the socket without damaging the mechanism.

The upper face of bracket 79 carries a solenoid 86 and a bearing block 87 on opposite sides of shaft 78. The solenoid has an armature 88 to which we attach a slotted yoke 89. A detent 90 projects from the inside face of this yoke. A latch wheel 91 and a pinion 92 are fixed to shaft 78. The wheel lies within the slot in yoke 89 and has a plurality of notches in its circumference cooperable with detent 90. The end of the yoke opposite the armature carries a rod 93 which is slidably received in the bearing block 87. A spring 94 encircles rod 93 and urges the yoke and armature to the left, whereby detent 90 normally engages one of the notches of wheel 91 and locks shaft 78 against rotation. Energizing solenoid 86 withdraws the detent to allow the shaft to turn. The underside of bracket 79 carries a rotary switch 95 which is operated by shaft 78 and connected to a resistance network 96 in the electric circuit, hereinafter described. Switch 95 is of the indexing type which is free to rotate to a positive position through the action of a series of cams and a detent. One example of a suitable switch is the single section (10 position) switch available from P. R. Mallory and Company, Inc., Indianapolis, Ind.

Pinion 92 meshes with a gear segment 97 which is fixed to a vertical shaft 98 pivoted to partition 51 and to the bottom wall of housing 35. A yoke 99 is fixed to the lower end of shaft 98. Another yoke 100 is slidably mounted on the intermediate portion of the shaft beneath partition 51 but turns with the shaft. Yoke 99 carries a die 101, stripper 102 and an upstanding rod 103 at one side of shaft 98, and a solenoid 104 at the other side. Yoke 100 carries a depending punch 105 cooperable with die 101. Springs 106 and 107 encircle shaft 98 and rod 103 and urge yoke 100 and punch 105 upwardly. Solenoid 104 has an armature 108 connected to yoke 100, whereby energizing the solenoid pulls the yoke downwardly against the action of springs 106 and 107. The underside of partition 51 carries a normally open electric switch 109 actuated by yoke 100. As FIGURE 5 shows, the inner edge of plate 57 has arcuate recesses 110 to accommodate the end of yoke 99 and the corresponding yokes of the other setting means.

In the mechanisms for setting the other digits of the pressure and the "dwell" time, the latch wheels may have different numbers of notches from wheel 91. For example, wheel 91 and the wheel in the "dwell" mechanism may have four notches each, and the wheels in the "hundreds" and "tens" mechanisms ten notches each, allowing a corresponding number of choices in each instance. Adjacent pinions 92a and gear segments 97a corresponding with pinion 92 and gear segment 97 are vertically offset, as FIGURE 4 shows, so that the gear segments can turn without interfering. The "dwell" mechanism has a rotary switch 112 similar to switch 95 and connected to a timer 113. (Switch 112 and timer 113 are shown only in FIGURE 7.) We include only one switch 109, although it is apparent we would place this switch in either of the other setting mechanisms without affecting the operation.

When we depress the punch handle 36, switch 69 closes, energizing solenoid 86 and releasing shaft 78. Knob 37 can turn shaft 78 to reset the apparatus for the specified "thousands" digit if different from the instant setting. Switch 95 adjusts the resistance network 96 accordingly.

Die 101 and punch 105 have angular positions corresponding with each of the possible "thousands" settings. As shaft 78 turns, it acts through pinion 92, gear segment 97 and shaft 98 to move the punch and die to the proper angular position. Next we momentarily depress the "print" switch button 41, energizing solenoid 104. Punch 105 engages its die 101 to place a punch mark 114 in the tally sheet 72 (FIGURE 5). Similar action takes place in the "hundreds," "tens" and "dwell" printing mechanisms, whereby the other digits of the pressure and also the "dwell" time can be set, and the timer 113 adjusted. Additional punch marks 115, 116 and 117 are placed in the tally sheet. Lowering of yoke 100 closes switch 109, energizing solenoid 67 and withdrawing armature 68 from cam 64. Spring 65 raises shaft 59 and withdraws punch 60, while cam 64 opens switch 69. Solenoid 104 is deenergized, whereupon springs 106 and 107 withdraw punch 105, and we can remove the completed tally sheet. We set our apparatus in this manner before applying pressure to the pipe P or the first pipe of a series to be tested under like conditions or recorded on one tally sheet.

The location of the punch mark 114 furnishes a positive record of the "thousands" digit of the pressure for which we set our apparatus, while the locations of the punch marks 115, 116 and 117 furnish a positive record of the "hundreds" and "tens" digits and the "dwell" time respectively. Before the tally sheet can be removed, shaft 78 and the other corresponding shafts again are locked against rotation. Hence no one can change the pressure and time settings once the tally sheet is punched. A stamped number at 74 on the tally sheet is an identifying mark which establishes that our apparatus actually punched the sheet. The number also establishes a record of the number of times changes are made in the pressure and dwell settings and of the order in which such changes are made. If anyone depresses handle 36 to release shaft 78 when there is no tally sheet positioned in the housing, the sequential numbering stamp 71 advances and there is a missing number among successive tally sheets.

*Electric circuit*

FIGURE 7 shows our preferred electric circuit, which is energized from a line 121 and a grounded line 122 connected across a suitable power source. We connect the cam-operated switch 69, solenoid 86 and a normally closed contact $A_1$ of a relay A across these lines. We connect the coil of relay A and the "print" switch 41 in series with switch 69 across these lines. Relay A has a normally open contact $A_2$ for locking itself in. We connect solenoid 104 and a normally open contact $A_3$ of relay A in series across the lines. We connect corresponding solenoids of the "hundreds" and "tens" digit mechanisms and of the "dwell" time mechanism in parallel with solenoids 86 and 104, as indicated at 86a and 104a (only one of each shown). We connect solenoid 67 and switch 109 in series across the lines. With the circuit thus far described, closing switch 69 energizes solenoids 86 and 86a and unlocks shaft 78 and the other corresponding shafts to enable the apparatus to be set to the specified pressure and time. Closing "print" switch 41 energizes and locks in relay A, whereupon contact $A_1$ opens and deenergizes solenoids 86 and 86a, again locking the shafts. Contact $A_3$ closes and energizes solenoids 104 and 104a to punch the pressure and time settings on the tally sheet 72. Switch 109 closes and energizes solenoid 67, whereupon the punch handle 36 returns to its raised position. Switch 69 opens and the parts return to their normal state and the completed tally sheet can be removed.

We connect the pressure switch 26, the coil of a relay B and a normally closed contact $C_1$ of a time-delay relay C in series across lines 121 and 122. We connect the pressure switch 27, the coil of a relay D, a normally open contact $B_1$ of relay B, and contact $C_1$ in series across the lines. Relay D has a normally open contact $D_1$ for locking itself in. We connect the pressure switch 28, the coil of a relay E, a normally open contact $D_2$ of relay D, and contact $C_1$ in series across the lines. Relay E has a normally open contact $E_1$ for locking itself in. We connect a "total piece" counter 123 in parallel with the coil of relay E. The counter per se is a known device and it is displayed through window 42 of housing 35. We connect the coil of the time delay relay C and switch 29 in series across the lines. We connect the coil of another relay F in parallel with the coil of relay C.

We connect a constant-current generator 124 to the resistance network 96. Switch 95 adjusts the magnitude of resistance offered by the network proportionally to the pressure at which we set the apparatus. A constant current passing through this resistance furnishes an output voltage signal which varies directly as the pressure setting. This signal goes to an operational amplifier 125, along with a voltage signal from the recorder 31, which latter signal varies directly with the actual pressure on the pipe. The operational amplifier transmits output signals to two parallel trigger devices 126 and 127. We connect trigger 126 to timer 113, and we connect the timer and the coil of a relay G in series across lines 121 and 122. We connect trigger 127 to the coil of a relay H, the other side of which we connect to line 121. The timer, resistance network, constant current generator, operational amplifier and triggers per se are known devices; hence we have not shown them in detail. For showings of a suitable operational amplifier, trigger circuit, and timer, reference can be made to Millman and Taub "Pulse, Digital and Switching Waveforms," pages 15, 389 and 517 respectively. For a showing of a suitable constant current generator, reference can be made to Ristenbutt and Riddle "Transistor Physics and Circuits," 2nd edition, page 112.

When we operate valve 22 to move the head 15 into engagement with pipe P, switch 26 closes and energizes relay B, whereupon contact $B_1$ closes and sets up relay D. When we open valve 23 to fill the pipe, switch 27 closes and energizes and locks in relay D, whereupon contact $D_2$ closes and sets up relay E. Once the pipe is filled, we close valve 23. Switch 27 opens, but relay D is locked in and contact $D_2$ stays closed. When we open valve 24 to intensify the pressure, switch 28 closes and energizes and locks in relay E. The "total piece" counter 123 registers a count. As pressure builds up with valve 24 open, a voltage signal of increasing magnitude reaches the operational amplifier 125 from recorder 31. If the pipe is acceptable, this signal ultimately matches the voltage signal from the resistance network 96. When the two voltages match, trigger 126 is actuated and transmits a signal to timer 113. The timer commences to time the "dwell" time to which it has been set through switch 112. As soon as the "dwell" time elapses, the timer completes a current path to energize relay G. In the event the pipe has a leak and the specified pressure never is reached, or if the pipe is not held under pressure for full "dwell" time setting, relay G is not energized.

We connect the coil of a relay J and normally open contacts $E_2$ and $G_1$ of relays E and G in series across lines 121 and 122. Relay J has a normally open contact $J_1$ for locking itself in around contact $G_1$. We connect an "incentive" counter 128 in parallel with the coil of relay J. The counter per se is a known device and is displayed through window 43 in housing 35. We connect a solenoid 129 and normally open contacts $E_2$, $F_1$ and $J_2$ of relays E, F and J respectively in series across lines 121 and 122. Solenoid 129 operates the nozzle 46 of the paint spray device 45. If relay G is energized and contact $G_1$ closes, relay J is energized and locked in. The "incentive" counter 128 registers a count that an acceptable pipe has been tested. Closing of contact $J_2$ sets up solenoid 129 for energization later in the cycle.

In setting up the machine 10, the operator selects the pressure which is to be applied through the intensifying line 19. The machine automatically limits the pressure to this magnitude. However, the operator may mistakenly set the machine to a pressure which is too high and exceeds the pressure set on our monitoring apparatus. In this event the voltage signal from recorder 31 exceeds that from the resistance network 96, whereupon the operational amplifier 125 actuates trigger 127 and energizes relay H. We connect the coil of a relay K and normally open contacts $H_1$, $E_2$ and $F_1$ of relays H, E and F respectively in series across lines 121 and 122. Relay K has a normally open contact $K_1$ for locking itself in around contact $H_1$. We connect a solenoid 130 and normally open contacts $K_2$, $F_1$ and $E_2$ of relays K, F and E respectively in series across these lines. Solenoid 130 operates nozzle 47 of the paint spray device 45. If relay H is energized, contact $H_1$ closes and energizes and locks in relay K, which sets up solenoid 130 for energization later in the cycle. It should be noted that the incentive counter 128 also acts in this circumstance.

We connect a solenoid 131, a normally closed contact $J_3$ of relay J, normally open contacts $F_1$ and $F_2$ of relay F, and the normally open contact $E_2$ of relay E in series across line 122 and 123. Solenoid 131 operates nozzle 48 of the pain spray device 45. We connect the coil of a relay L, a "bad test" light 132 and a capacitor 133 in parallel with solenoid 131. Relay L has a normally open contact $L_1$ for locking itself in. Relay E has a normally closed contact $E_3$ in series with contact $L_1$. If test conditions are met and relay J is energized, as already described, contact $J_3$ opens and prevents operation of this part of the circuit.

At the conclusion of a test, valve 22 is closed manually. Thus the head 15 moves away from the pipe, switch 26 opens and relay B is deenergized. The resulting pressure drop in the pipe also deenergizes relays G and H is energized. Next the kickout valve 25 is opened manually, whereupon switch 29 closes, relay F is energized, and its contacts $F_1$ and $F_2$ close. If the pipe has met the test conditions, solenoid 129 is energized through contacts $E_2$, $F_1$ and $J_2$, and the nozzle 46 applies a spray of paint to the pipe. If the pipe has been subjected to excessive pressure, solenoid 130 also is energized through contacts $E_2$, $F_1$ and $K_2$, and the nozzle 47 applies a second spray of paint to the pipe. If the pipe has not met test conditions, solenoid 131 is energized through contacts $E_2$, $F_1$, $J_3$ and $F_2$ and the nozzle 48 applies a spray of paint to the pipe. Relay L is energized, its contact $L_1$ closes, the "bad test" light 132 comes on, and the capacitor 133 charges.

After a delay, relay C is energized and its contact $C_1$ opens to deenergize relays D and E. If relay J or K is energized, it is deenergized as contact $E_2$ opens. If relay L is energized, it remains energized via contacts $L_1$ and $E_3$, both of which now close. The "bad test" light 132 remains lighted until relay E is energized during the next test cycle, thus alerting the operator that a pipe has not met specifications. The capacitor 133 maintains relay L energized until contact $E_3$ closes if there is not sufficient overlap. The purpose of the delay in energizing relay C is to prevent the circuit from resetting before the pipe actually is removed from the testing machine. This prevents anyone from closing switch 29 only long enough to energize relay C but not long enough for the kickout mechanism to act. Thus the counters do not register repeated tests on the same pipe.

From the foregoing description it is seen that our invention affords an apparatus for monitoring a pressure-testing machine and recording the results, but prevents tampering. The pressure and "dwell" time used in a test can be changed only if shown on a tally sheet. Otherwise there will be missing numbers in the sequence of tally sheets. The apparatus assures also that each item tested is properly marked as to its classification.

While we have shown and described only a single embodiment of our invention, it is apparent that modifications may arise. Therefore, we do not wish to be limited to the disclosure set forth but only by the scope of the appended claims.

We claim:

1. An apparatus for monitoring the operation of a pressure-testing machine, which apparatus comprises:
    a housing adapted to receive a tally sheet;
    locking means in said housing engageable with a tally sheet received therein and having a released position in which the tally sheet can be inserted or removed and a position for locking a tally sheet in the housing;
    adjustable means in said housing for setting conditions to be used in a test and recording the same on the tally sheet;
    means operatively connecting said setting means and said locking means for preventing adjustment of said setting means unless said locking means is in its locking position; and
    means operatively connecting said locking means and said setting means to hold said locking means in its locking position until the test conditions are recorded on the tally sheet.

2. An apparatus as defined in claim 1 further comprising means in said housing operatively connected with said locking means for applying sequential identifying marks to successive tally sheets as said locking means is moved to its locking position.

3. An apparatus as defined in claim 1 further comprising marking means operatively connected with said setting means for marking each item tested as to whether it is tested in accordance with the set conditions.

4. An apparatus as defined in claim 3 further comprising additional marking means for distinguishing an item which has been subjected to excessive conditions in testing.

5. An apparatus as defined in claim 1 further comprising means in said housing operatively connected with said setting means for recording both the total number of items tested and the number of items tested at the set conditions.

6. An apparatus as defined in claim 5 further comprising means in said housing operatively connected with said last-named recording means to prevent recording of additional items tested until an item is removed from the testing machine.

7. An apparatus as defined in claim 1 in which said locking means includes a punch engageable with the tally sheet, and in which the means holding said locking means in its locking position includes a cam movable with said punch, a solenoid, and a cooperating armature, said armature engaging said cam, said solenoid being energized and withdrawing said armature from said cam when the test conditions are recorded on the tally sheet.

8. An apparatus as defined in claim 1 in which said setting means includes means for setting both the "dwell" time to be used in the test and a plurality of digits of the pressure.

9. An apparatus as defined in claim 1 in which said setting means includes a punch engageable with the tally sheet to apply a punch mark thereto, the location of which furnishes a record of the dwell time to be used in the test, a plurality of punches engageable with the tally sheet to apply punch marks thereto, the locations of which furnish a record of digits of the pressure to be used in the test, an adjustable timer connected to said first-named punch, an adjustable electric resistance connected to said second-named punches, and means connected to said resistance through said timer for recording the number of items tested at the set time and pressure.

10. An apparatus as defined in claim 9 in which said last-named means includes a constant current generator connected to said resistance for producing a voltage signal proportional to the magnitude of the resistance, an operational amplifier connected to said resistance to receive said voltage signal along with another voltage signal proportional to the actual pressure, and a trigger connected to said amplifier and to said timer for actuating the timer when the two signals match.

11. The combination, with a pressure-testing machine, which includes relatively movable means for sealing an item undergoing test, inlet means for introducing fluid to the item, intensifying means for applying pressure to the item through the fluid, means for measuring the actual pressure on the item, and kickout means for removing the item at the conclusion of a test, of a monitoring apparatus comprising:

a housing adapted to receive a tally sheet;
locking means in said housing engageable with a tally sheet received therein and having a released position in which the tally sheet can be inserted or removed and a position for locking a tally sheet in the housing;
adjustable means in said housing operatively connected with said machine for setting conditions to be used in a test and recording the same on the tally sheet;
means operatively connecting said setting means and said locking means for preventing adjustment of said setting means unless said locking means is in its locking position;
means operatively connecting said locking means and said setting means to hold said locking means in its locking position until the test conditions are recorded on the tally sheet;
means in said housing operatively connected with said intensifying means for recording the total number of items tested;
means in said housing operatively connected with said pressure-measuring means and with said setting means for recording the number of items tested at the set conditions; and
means operatively connected with said kickout means for preventing further operation of said last-named recording means until the item has been removed from said machine.

12. A combination as defined in claim 11 in which said apparatus further comprises means in said housing operatively connected with said locking means for applying sequential identifying marks to successive tally sheets as said locking means is moved to its locking position.

13. A combination as defined in claim 11 in which said apparatus further comprises marking means operatively connected with said setting means and said machine for marking each item as to whether it is tested in accordance with the set conditions.

14. A combination as defined in claim 11 in which said setting means includes a punch engageable with the tally sheet to apply a punch mark thereto, the location of which furnishes a record of the dwell time to be used in the test, and a plurality of punches engageable with the tally sheet to apply punch marks thereto, the locations of which furnish a record of digits of the pressure to be used in the test.

15. A combination as defined in claim 14 in which the connection between the means for recording the number of items tested at the set conditions and said setting means includes an adjustable timer connected to said first-named punch, an adjustable resistance connected to said second-named punches, a constant current source connected to said resistance to produce a voltage signal which varies with the pressure setting, and an operational amplifier connected to said resistance and to said pressure-measuring means to actuate said timer when the pressure matches the setting, said timer actuating the recording means when the dwell time at the pressure setting elapses.

References Cited
UNITED STATES PATENTS 2,962,655 11/1960 Wiley et al.
3,295,140 12/1966 Parker et al. _____ 346—34
3,320,618 5/1967 Kuch et al. _____ 346—44 XR LOUIS R. PRINCE, *Primary Examiner.*

J. NOLTON, *Assistant Examiner.*

U.S. Cl. X.R.

346—33